(12) United States Patent
Amaru et al.

(10) Patent No.: US 10,007,110 B2
(45) Date of Patent: Jun. 26, 2018

(54) VEHICLE USE PORTABLE HEADS-UP DISPLAY

(71) Applicant: SmartHUD, Inc., Beverly, MA (US)

(72) Inventors: Michael Amaru, Reading, MA (US); Gustavo Herrera, Cambridge, MA (US)

(73) Assignee: SENSEDRIVER TECHNOLOGIES, LLC, Beverly, MA (US)

(*) Notice: Subject to any disclaimer, the term of this patent is extended or adjusted under 35 U.S.C. 154(b) by 0 days. days.

(21) Appl. No.: 14/448,549

(22) Filed: Jul. 31, 2014

(65) Prior Publication Data
US 2015/0054760 A1 Feb. 26, 2015

Related U.S. Application Data

(60) Provisional application No. 61/860,366, filed on Jul. 31, 2013.

(51) Int. Cl.
*G02B 27/01* (2006.01)
*B60R 11/02* (2006.01)
(Continued)

(52) U.S. Cl.
CPC ...... *G02B 27/0101* (2013.01); *B60R 11/0229* (2013.01); *B60R 11/0264* (2013.01);
(Continued)

(58) Field of Classification Search
CPC G02B 27/01; G02B 27/0101; G02B 27/0103; G02B 26/127; G09G 2380/10;
(Continued)

(56) References Cited

U.S. PATENT DOCUMENTS

| 3,936,605 A | * | 2/1976 | Upton | G02B 27/01 351/50 |
| 4,740,780 A | | 4/1988 | Brown et al. | |

(Continued)

FOREIGN PATENT DOCUMENTS

| CN | 202986989 | 6/2013 |
| DE | 102011120948 | 5/2013 |

(Continued)

OTHER PUBLICATIONS

Search Report and Written Opinion dated Dec. 11, 2014 in related PCT application No. PCT/US2014/049225.

(Continued)

*Primary Examiner* — Jennifer Mehmood
*Assistant Examiner* — James Nokham

(57) ABSTRACT

Provided is a system for presenting information to a driver in a vehicle with a steering wheel and dashboard and/or windshield includes a first enclosure that supports a mobile device and a combiner glass (e.g., half reflective mirror) on the dashboard or windshield. A second bracket releasably attaches a tactile input device to the steering wheel. The tactile input device generates signals representing motion of the driver's finger or thumb across a touch pad and the actuation of an entry key of the device. The tactile input device and the mobile device communicate wirelessly, in preferred embodiments. The enclosure supports the mobile device to have an orientation with respect to the combiner glass that produces a heads-up display that can be controlled by the driver's interaction with the tactile input device. Advantageously, the present invention provides systems and methods that minimize visual, mechanical and cognitive distractions.

36 Claims, 12 Drawing Sheets

(51) Int. Cl.
*G06F 3/0354* (2013.01)
*B60R 11/00* (2006.01)

(52) U.S. Cl.
CPC ......... *G02B 27/01* (2013.01); *G02B 27/0149* (2013.01); *G06F 3/03547* (2013.01); *B60R 2011/001* (2013.01); *B60R 2011/0005* (2013.01); *B60R 2011/0026* (2013.01); *B60R 2011/0059* (2013.01); *G02B 2027/014* (2013.01); *G02B 2027/0169* (2013.01); *G02B 2027/0187* (2013.01); *G02B 2027/0196* (2013.01); *G06F 2203/0384* (2013.01)

(58) Field of Classification Search
CPC .. B60K 35/00; B60K 37/02; G60R 2300/205; B60R 11/0241; B60R 1/0264; G06F 3/03547; G01C 21/3632; G01C 21/365; H04M 1/6075
USPC ......... 345/173–174, 7–9, 179; 359/630–631; 701/36–48, 533, 532; 248/206.2; 353/14
See application file for complete search history.

(56) References Cited

U.S. PATENT DOCUMENTS

| | | | |
|---|---|---|---|
| 5,013,135 A * | 5/1991 | Yamamura | G02B 3/08 340/980 |
| 5,214,413 A * | 5/1993 | Okabayashi | G02B 26/127 345/7 |
| 5,394,203 A | 2/1995 | Murphy et al. | |
| 5,555,502 A * | 9/1996 | Opel | B60H 1/00985 701/36 |
| 5,677,701 A * | 10/1997 | Okuyama | B60K 37/02 345/7 |
| 5,878,395 A | 3/1999 | Bennett | |
| 5,905,477 A * | 5/1999 | Kuwayama | B60K 35/00 345/7 |
| 6,078,428 A | 6/2000 | Rambert et al. | |
| 6,209,767 B1 * | 4/2001 | Liou | B60R 11/0264 224/276 |
| 6,529,381 B1 | 3/2003 | Schoenfish | |
| 6,789,901 B1 * | 9/2004 | Kormos | G02B 27/0101 345/9 |
| 6,832,151 B2 | 12/2004 | Kumazaki et al. | |
| 7,111,996 B2 | 9/2006 | Seger et al. | |
| 7,126,583 B1 | 10/2006 | Breed | |
| 7,353,110 B2 | 4/2008 | Kim | |
| 7,623,294 B2 * | 11/2009 | Harada | G02B 27/01 359/13 |
| 7,734,414 B2 | 6/2010 | Gershony et al. | |
| 8,249,798 B2 | 8/2012 | Hawes et al. | |
| 8,503,762 B2 | 8/2013 | Ben Tzvi | |
| 8,781,670 B2 | 7/2014 | Dolgov et al. | |
| 8,786,697 B2 | 7/2014 | Kawasaki | |
| 9,274,336 B2 | 3/2016 | Deubzer et al. | |
| 2002/0068605 A1 | 6/2002 | Stanley | |
| 2003/0043029 A1 | 3/2003 | Ichikawa et al. | |
| 2004/0160124 A1 | 8/2004 | Arai | |
| 2004/0164971 A1 * | 8/2004 | Hayward | G06F 3/03547 345/179 |
| 2004/0204004 A1 | 10/2004 | Chen | |
| 2006/0012884 A1 | 1/2006 | Snorteland | |
| 2007/0082713 A1 * | 4/2007 | Tsai | H04M 1/6075 455/569.2 |
| 2007/0217018 A1 * | 9/2007 | Fredriksson | G02B 27/0103 359/631 |
| 2007/0233376 A1 | 10/2007 | Gershony et al. | |
| 2008/0001727 A1 | 1/2008 | Ohsumi et al. | |
| 2009/0150061 A1 * | 6/2009 | Chen | G01C 21/365 701/532 |
| 2010/0268426 A1 * | 10/2010 | Pathak | G06F 3/03547 701/48 |
| 2010/0320341 A1 * | 12/2010 | Baumann | B60R 11/0241 248/206.2 |
| 2011/0001932 A1 * | 1/2011 | Zuehlsdorff | G01C 21/3632 353/14 |
| 2011/0093190 A1 * | 4/2011 | Yoon | G01C 21/365 701/533 |
| 2014/0267066 A1 * | 9/2014 | Kolehmainen | G08C 17/02 345/173 |
| 2014/0320973 A1 | 10/2014 | Deubzer et al. | |

FOREIGN PATENT DOCUMENTS

| | | |
|---|---|---|
| FR | 2943431 | 9/2010 |
| KR | 20130036934 | 4/2013 |
| WO | 2015017693 | 2/2015 |
| WO | 2015095849 | 6/2015 |
| WO | 2015134840 | 9/2015 |
| WO | 2016123248 | 8/2016 |

OTHER PUBLICATIONS

International Search Report dated Apr. 13, 2016 in related PCT Application No. PCT/US16/15187.
International Search Report and Written Opinion dated Jun. 19, 2015 in corresponding PCT Application No. Application No. PCT/US2015/019113.
Stroub, S, "Gearing Up to Battle Snow" 2, Heads Up! Feb. 12, 2014. Retrieved from the Internet: <URL: https://seancrosspoints.wordpress.com/2014/02/12/GEARING-UP-TO-BATTLE-SNOW-2-HEADS-UP/>; paragraph 7.
Eley, B. Magnetstick-Onperiscope Lense for Iphoneand Camera Phones Surfaces May 7, 2013, Retrieved from the internet : <URL: http://geardiary.com/2013/05/07/magnet-stick-on-periscope-lense-for-iphone-and-camera-phones-surfaces/>; paragraph 3; figure 2.
ISRWO dated Apr. 7, 2015 in corresponding International Application No. PCT/US2014/71759.
EESR dated Mar. 6, 2017 issued in corresponding European Application No. 14831305.9.
Colaner, Seth, "$99 SenseHUD Merely Beginning of SenseDriver's Push for Auto Display Platform Dominance". Dec. 31, 2014. Retrieved from the Internet: http://www.tomshardware.com/news/sensedriver-sensehud-99-copilot,28289.html.
Cunningham, Wayne, "SenseHUD, The Smartphone-Powered Windshield Display". Jan. 6, 2015. Retrieved from the Internet: https://www.cnet.com/roadshow/auto/sensedriver-technologies-sensehud/preview/.
Kee, Edwin, "SenseHUD, Is the Ultimate Portable Head-Up Display". Jan. 7, 2015. Retrieved from the Internet: http://www.ubergizmo.com/2015/01/sensehud-is-the-ultimate-portable-head-up-display/.
Marks, Lester Victor, "SenseHUD Turns your Iphone into a portable heads-up display". Jan. 7, 2015. Retrieved from the Internet: http://appleinsider.com/articles/15/01/07/first-look-sensehud-turns-your-iphone-into-a-portable-heads . . . .
Partial European Search Report dated Aug. 14, 2017 issued in corresponding European Application No. 14872906.4.
Extended European Search Report dated Jan. 19, 2018 issued in corresponding European Application No. 14872906.4.

* cited by examiner

VEHICLE USE PORTABLE HEADS-UP DISPLAY

CROSS-REFERENCE TO RELATED APPLICATIONS

This application claims the benefit of priority under 35 U.S.C. § 119(e) from co-pending U.S. provisional patent application Ser. No. 61/860,366, entitled Mobile Device Software Application Powered Portable Head-up Display for Automotive Use, filed Jul. 31, 2013, the content of which is incorporated herein in its entirety by reference.

FIELD OF INTEREST

This invention is generally directed to use of heads-up displays and particularly to the use of such heads-up displays in vehicles, such as motor vehicles, for a driver's benefit.

BACKGROUND

The advent of cell phones, and more particularly mobile devices such as smartphones, has had a significant impact on driving safety. For purposes of definition, the term "mobile device" is meant to include any mobile telephone, tablet, etc, including those that operate with a smartphone platform, or operating system, such as the Android platform. These mobile devices incorporate many applications, or "apps," for a variety of different purposes. Such popular applications include those that provide global positioning system (GPS) information and directions, access to a driver's custom music library stored within or accessible from a mobile device, and texting or messaging.

Many automobile accidents are now attributed to a driver's use of a cell phone or other mobile device while driving. A number of states ban a driver from text messaging while driving and/or even using a cell phone while driving. Many countries ban all cell phone use while driving. These measures have been undertaken, in part, because a driver's use of a cell phone or other mobile device can distract the driver from the primary responsibility of safe driving.

Three types of distraction are now recognized. A visual distraction occurs when the driver takes his or her eyes off the road. A manual/mechanical distraction occurs when the driver removes one or both hands from the steering wheel. Either or both of these distractions or other events can lead to a cognitive distraction whereby the driver's reaction times may be delayed or extended.

There have been a number of approaches taken to minimize such distractions, however many of such systems still lead to at least one driver distraction, namely, a visual, manual, or cognitive distraction.

Hence, a need exists for a system that provides information to a driver through a heads-up display and input through a device conveniently mounted on a steering wheel such that visual, mechanical and cognitive driving distractions are minimized.

SUMMARY

In accordance with one aspect of this invention, a system for providing information to a driver in a vehicle with a steering wheel and dashboard and/or windshield includes a display assembly, a platform that supports a mobile device with display (e.g., a smartphone, tablet, etc.), a combiner glass (e.g., half reflective mirror) that presents a display, and a bracket that mounts or couples the assembly to a surface or vehicle component, e.g., to a dashboard or windshield. A second bracket releasably attaches a tactile input device to the steering wheel. The tactile input device generates signals representing motion of the driver's finger or thumb across a touch pad and the actuation of an entry key of the device. The tactile input device and the mobile device communicate wirelessly, in preferred embodiments. The display assembly supports the mobile device to have an orientation with respect to the combiner glass that produces a heads-up display that can be controlled by the driver's interaction with the tactile input device. Advantageously, the present invention provides systems and methods that minimize visual, mechanical and cognitive distractions.

In accordance with one aspect of the inventive concept, provided is a vehicle heads-up display system. The system comprises a display assembly and a tactile input device. The display assembly comprises: a platform configured to support a portable electronic device having a display screen; a combiner glass oriented at an angle with respect to the supported electronic device display screen to at least partially reflect an output from the display screen; and a coupler configured couple to a surface or a component of a vehicle. The tactile input device comprises: a touch-sensitive input device responsive to user inputs; a transceiver configured to communicate electronic device control signals to the electronic device in response to the user inputs; and a bracket configured to couple the tactile input device to a steering apparatus.

In various embodiments, the coupler can be configured to couple the platform to at least one of a windshield or dashboard.

In various embodiments, the combiner glass includes a mirror.

In various embodiments, the mirror can be a semi-transparent mirror.

In various embodiments, the mirror can be about a 50% reflective mirror.

In various embodiments, the platform can be configured to align the display screen of the electronic device with the combiner glass.

In various embodiments, the combiner glass can be oriented to reflect the output of the display screen of the supported electronic device in a direction substantially opposite a travel direction of the vehicle.

In various embodiments, the combiner glass can be oriented to reflect the output of the display screen at an angle in a range of greater than 0 degrees and about 90 degrees relative to the surface of the display screen of the supported electronic device.

In various embodiments, the combiner glass can be oriented to reflect the output of the display screen at an angle in a range of about 22.5 degrees to about 67.5 degrees relative to the surface of the display screen of the supported electronic device.

In various embodiments, the touch-sensitive input device can be a touchscreen.

In various embodiments, the touch-sensitive input device can be responsive to finger swiping motions.

In various embodiments, the tactile user input device can further comprise an enter button responsive to user actuation to register a selection of an electronic device option.

In various embodiments, the enter button is integral with the touch-sensitive input device.

In various embodiments, the tactile input device can further comprise a processor-enabled input device application configured to process the user inputs and to responsively generate the electronic device control signals for output by the transceiver.

In various embodiments, the tactile input device can comprise housing including the touch-sensitive input device, wherein the housing can be detachable from the bracket.

In various embodiments, the system can further comprise a control application configured to be installed on the electronic device and, once installed, configured to communicate with the tactile input device.

In various embodiments, the control application can be configured to disable input devices of the electronic device in response to a signal from the tactile input device.

In various embodiments, the control application can be configured to put the electronic device in a drive mode wherein at least some of the input mechanisms or devices of the electronic device are disabled.

In various embodiments, the control application can be configured to enable user control of one or more of a music application, a navigation application, a phone application, a text application, a social media application, and/or combinations of one or more thereof via the tactile input device.

In various embodiments, the electronic device can be a mobile device with display (e.g., a smartphone, tablet, etc.) configured to host the control application.

In accordance with another aspect of the inventive concept, provided is a display assembly of a vehicle heads-up display system, comprising: a platform configured to support a portable electronic device having a display screen; a combiner glass oriented at an angle with respect to the supported electronic device display screen to at least partially reflect an output from the display screen; and a coupler configured couple to a surface or a component of a vehicle.

In various embodiments, the coupler can be configured to couple the platform to at least one of a windshield or dashboard.

In various embodiments, the combiner glass can include a mirror.

In various embodiments, the mirror can be a semi-transparent mirror.

In various embodiments, the mirror can be about a 50% reflective mirror.

In various embodiments, the platform can be configured to align the display of the electronic device with the combiner glass.

In various embodiments, the combiner glass can be oriented to reflect the output of the display screen of the supported electronic device in a direction substantially opposite a travel direction of the vehicle.

In various embodiments, the combiner glass can be oriented to reflect the output of the display screen at an angle in a range of greater than 0 degrees and about 90 degrees relative to the surface of the display screen of the supported electronic device.

In various embodiments, the combiner glass can be oriented to reflect the output of the display screen at an angle in a range of about 22.5 degrees to about 67.5 degrees relative to the surface of the display screen of the supported electronic device.

In accordance with another aspect of the inventive concept, provided is a tactile input device, comprising: a housing; touch-sensitive input device configured to receive user inputs; a processor-enabled input device application configured to process the user inputs and to responsively generate electronic device control signals; a transceiver configured to wirelessly communicate the electronic device control signals to a portable electronic device; and a bracket configured to couple the housing to a steering apparatus.

In various embodiments, the touch-sensitive device can include a selection mechanism configured to register a user selection of an electronic device option.

In various embodiments, the touch-sensitive input device can be a touchscreen.

In various embodiments, the touch-sensitive input device can be responsive to finger swiping motions.

In various embodiments, the tactile user input device can further comprise an enter button responsive to user actuation to register a selection of an electronic device option.

In various embodiments, the enter button can be integral with the touch-sensitive input device.

In various embodiments, the electronic device can be a mobile device with display (e.g., a smartphone, tablet, etc.) configured to host the control application.

In various embodiments, the housing can be detachable from the bracket.

In accordance with another aspect of the inventive concept, provided is a method of interacting with a portable electronic device, comprising: maintain the electronic portable device in a display assembly comprising: a platform configured to support a portable electronic device having a display screen; a combiner glass oriented at an angle with respect to the supported electronic device display screen to at least partially reflect an output from the display screen; and a coupler configured couple to a surface or a component of a vehicle. The method further includes controlling the electronic device with a tactile input device, comprising: a touch-sensitive input device configured responsive to user inputs; a transceiver configured to communicate electronic device control signals to the electronic device in response to the user inputs; and a bracket configured to couple the tactile input device to a steering apparatus.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
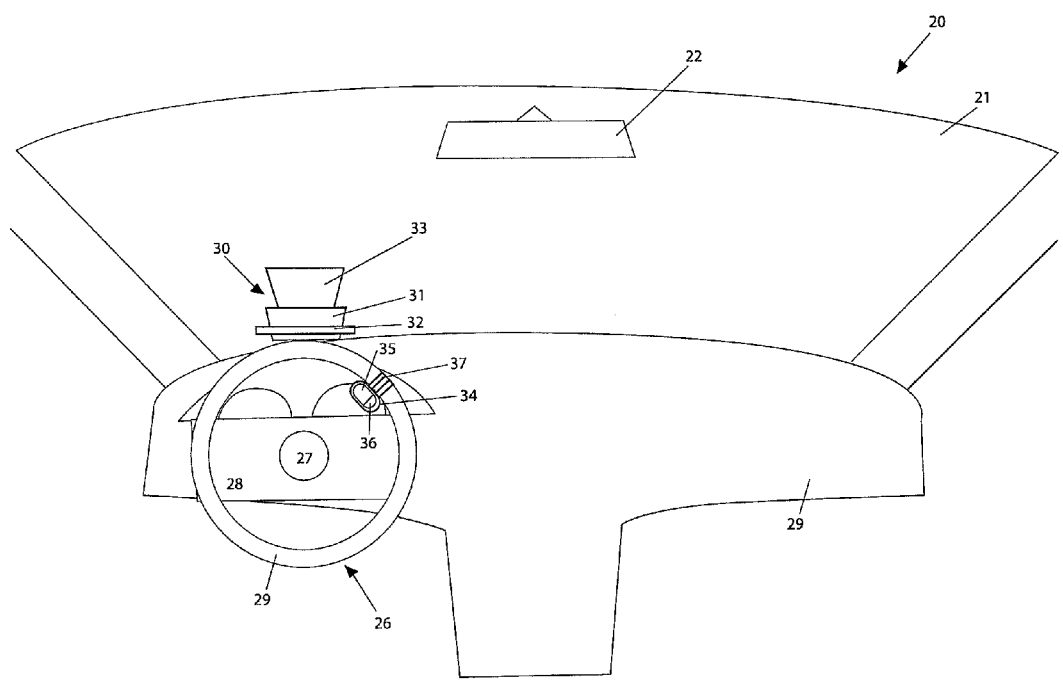
FIG. 1 is a representation of an embodiment of a driver's view of a dashboard and windshield of a vehicle in combination with a vehicle use portable heads-up display system, in accordance with aspects of the inventive concept.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative term's, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Exemplary embodiments are described herein with reference to cross-sectional illustrations that are schematic illustrations of idealized exemplary embodiments (and intermediate structures). As such, variations from the shapes of the illustrations as a result, for example, of manufacturing techniques and/or tolerances, are to be expected. Thus, exemplary embodiments should not be construed as limited to the particular shapes of regions illustrated herein but are to include deviations in shapes that result, for example, from manufacturing.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In the embodiment of FIG. 1, there is depicted a portion 20 of the interior of an automobile cabin as viewed from a front seat. Specifically, the embodiment of FIG. 1 depicts a windshield 21, a rear view mirror 22, a dashboard 23, and a steering wheel 26. The steering wheel 26 includes a hub 27, radial spokes 28 and an outer ring 29. This view is merely representative, for purposes of explanation. It will be apparent that different motor vehicles will have different specific configurations.

FIG. 1 is a representation of an embodiment of a driver's view of a dashboard 23 and windshield 21 of a vehicle that incorporates a heads-up display system 10 embodying aspects of the inventive concept. The heads-up display system 10 of FIG. 1 includes a display assembly 30 and a tactile input device 34.

The display assembly 30 can be dash or windshield mountable, as examples. In such cases, the display assembly 30 can include a enclosure 31 configured to mount to the windshield 21 or dashboard 23, as in this embodiment. The bracket enclosure 31 includes a platform 81 that supports or holds a mobile device 32 with display (e.g., a smartphone, tablet, etc.) with the screen facing up and a combiner glass 33 (e.g., a heads-up display) that reflects the image of the mobile device.

The input assembly 34 includes a tactile device 35 with a touch pad 36 and an input, or "enter," key 37. A bracket 38 attaches the tactile device 35 to the outer ring 29 of the steering wheel 26. In FIG. 1, the input assembly 34 is mounted for a right-handed driver. The input assembly 34 can also be readily mounted on the other side of the steering wheel 26 for a left-handed driver.

Figure 10:
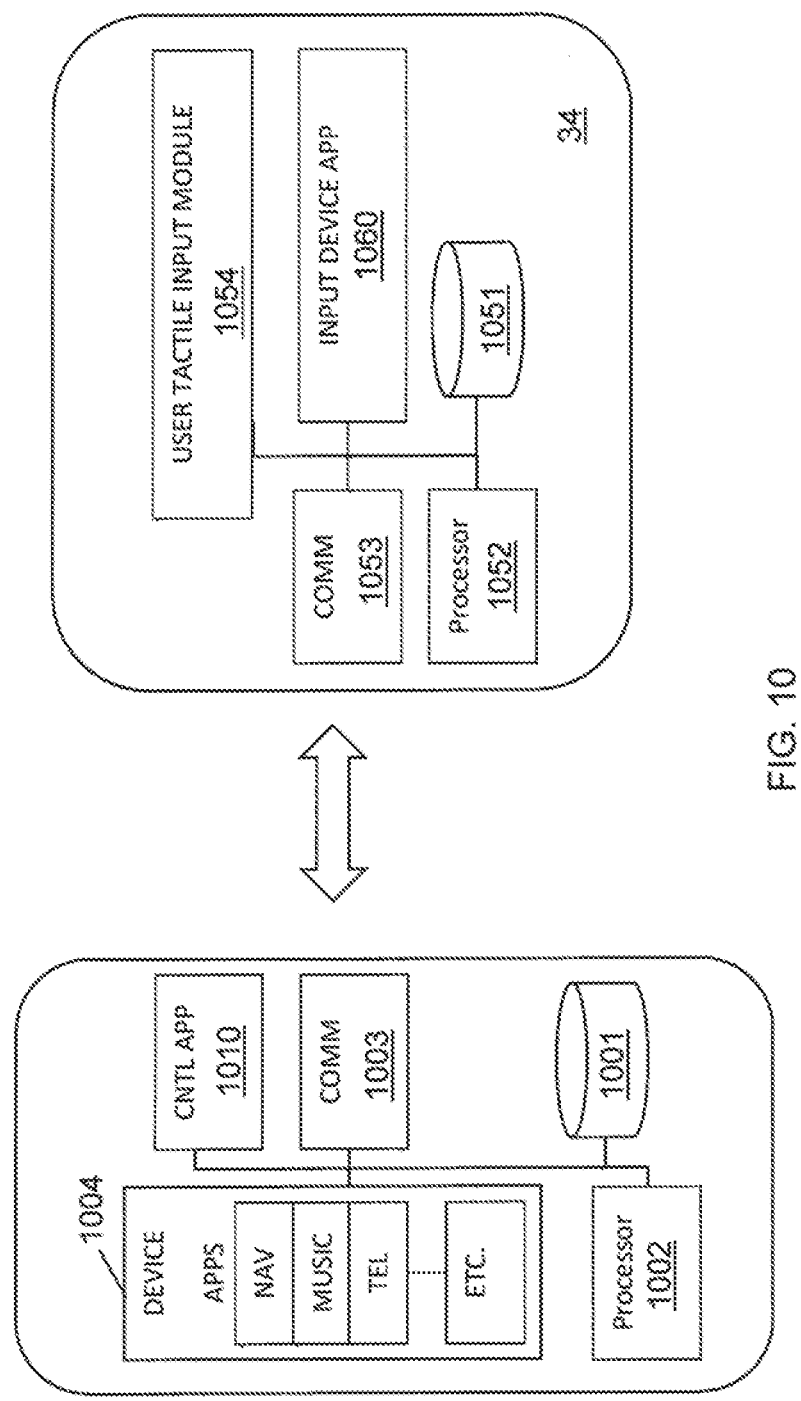
FIG. 10 is a block diagram showing an embodiment of various functional modules that can be included in a vehicle use portable heads-up display system, in accordance with aspects of the inventive concept.

To use the heads-up display system 10 the driver can initiate a heads-up display control application in the mobile device 32 and establish a driving mode, e.g., see control application 1010 in FIG. 10. In this mode, the functions and applications of the mobile device 32 can be limited to the heads-up display control application 1010 and other applications it references during operation, see 1004 in FIG. 10. Images projected onto the combiner glass 33 preferably contain essential information from which the driver can make a selection using the input assembly 34. Specifically, the driver makes a selection by moving (or swiping) a finger, such as the thumb, over the tactile input device, which can be a touch pad 36, to highlight an option. With an option highlighted, the user can select the option using a selection mechanism, which could have the form of a depressible input (or "enter") key 37, to invoke the selection without having to look at the input assembly 34, thereby minimizing any visual, manual or cognitive distractions during such operations.

Figure 2:
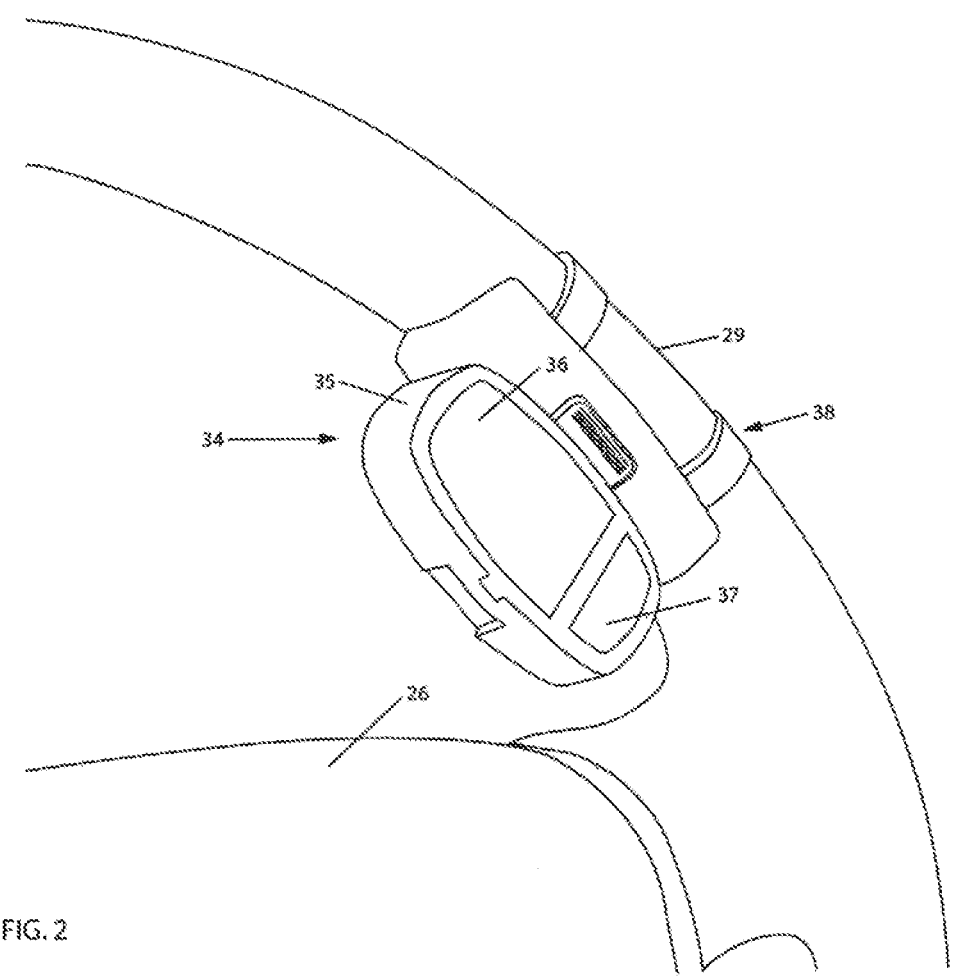
FIG. 2 is a view of an embodiment of the tactile input device coupled to a vehicle steering wheel, in accordance with aspects of the inventive concept.
Figure 3:
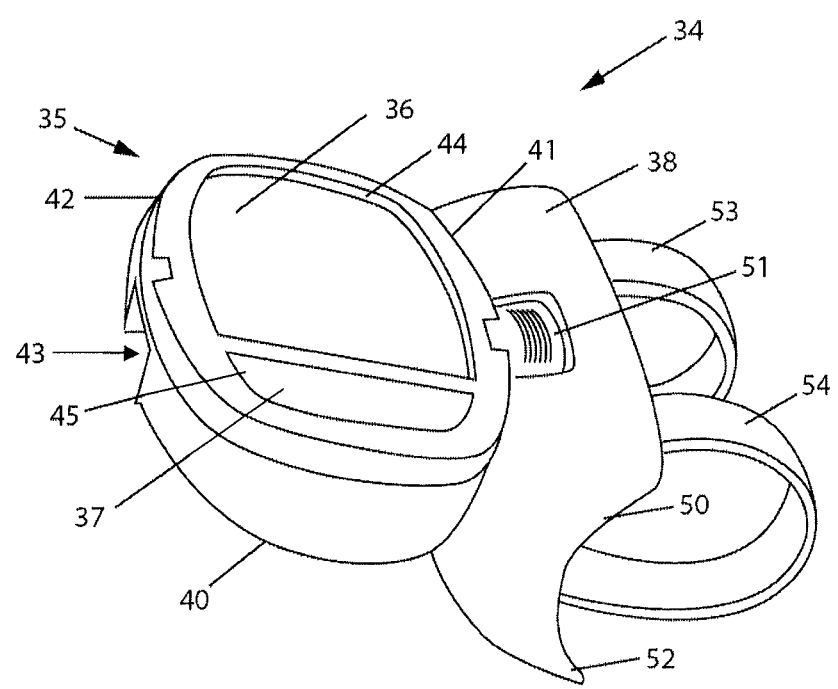
FIG. 3 is a perspective view of the tactile input device of FIG. 2.
Figure 4:
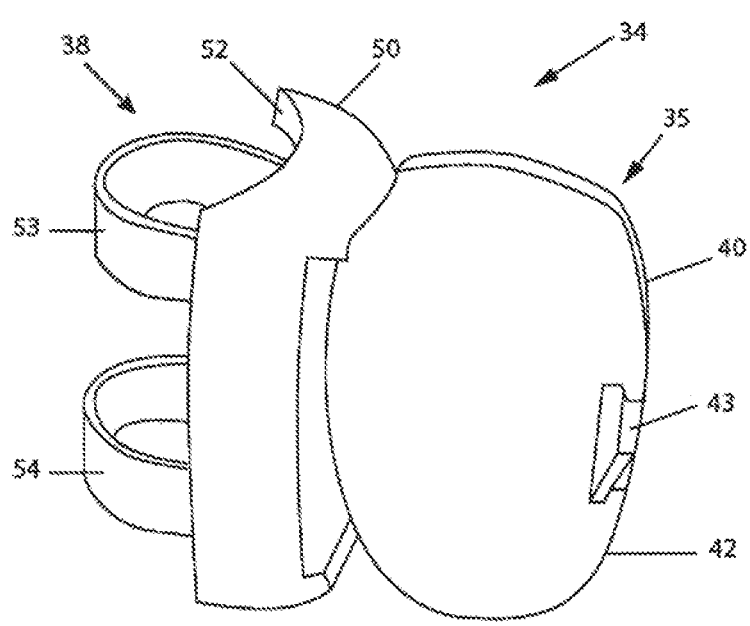
FIG. 4 is a rear perspective view of the tactile input device of FIG. 2.
Figure 5:
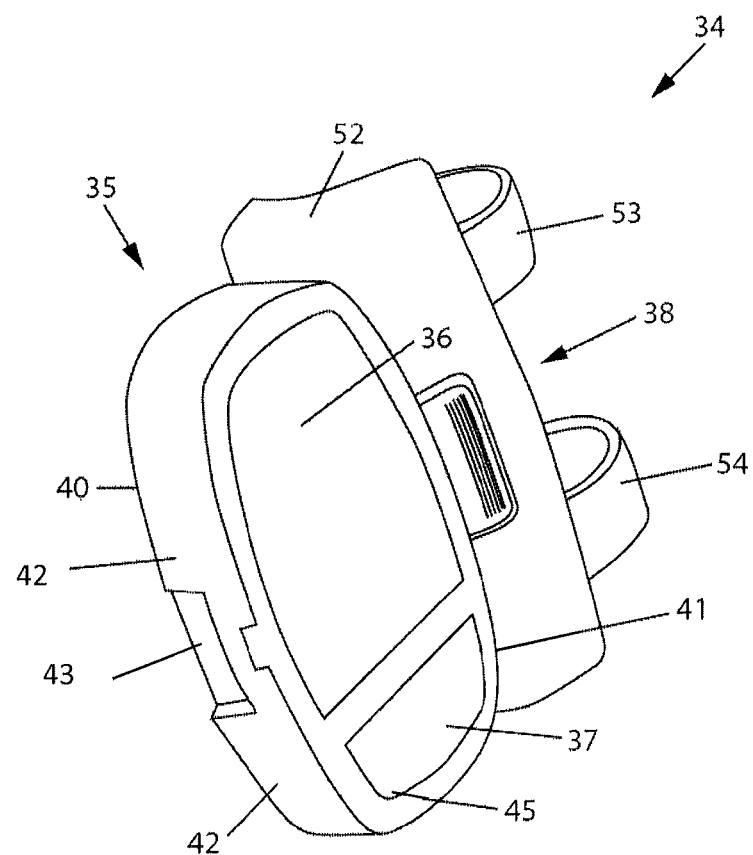
FIG. 5 is a different perspective view of the tactile input device of FIG. 2.

FIG. 2 depicts an embodiment of a tactile input device or assembly 34 attached to the outer ring 29 of the steering wheel 26. FIGS. 3-5 provide different views of the input assembly 34, including details of the structure of the tactile device 35 and the bracket 38 used in this embodiment for attaching or coupling the input assembly to the steering wheel. Referring to FIGS. 3 and 5, the tactile device 35 includes a housing 40 with an elongated ovoid shape. Each of the sides 41 and 42 of the housing 40 includes a mounting structure 43 that interfaces with a complementary mounting structure on the bracket 38, whereby the tactile device 35 is detachable from the bracket 38. Various types of bracket assemblies, including those known in the art, can be used to removably attach the housing 40 (using mounting structure 43) to the steering wheel 29. The housing 40 includes a first opening 44 that frames the touch pad 36. In embodiments having a designated enter key 37, the housing can also include a second opening 45 that frames the enter key 37. In other embodiments, the enter key function could be integral with the touch pad. For example, a two rapid taps (or other sequence) on the touch pad 36 could initiate an enter key function. In still other embodiments, the enter key 37 could be located at a different location on the housing 40, for example on a side 41 and/or 42 thereof Still referring to FIGS. 3 through 5, the bracket 38 includes a body portion 50 having a release 51 that complements the mounting structure 43. In this particular embodiment, the tactile device 35 snaps into the corresponding edge of the bracket body portion 50. Depressing the release 51 allows the tactile device 35 and the bracket 38 to separate. The opposite sides of the housing forms a curved body structure 52 that adapts to the outer ring 29 of a steering wheel 26, as shown in FIG. 2. Straps 53 and 54 are molded with the body portion 50 to wrap around the steering wheel outer ring 29 and be received in a capture mechanism not shown, but known in the art. Such strapping or securing mechanisms brackets are designed to be releasable easily from the outer ring of the steering wheel.

In this embodiment, the bracket 38 is also symmetrical around a horizontal central axis. Consequently, the bracket 38 can be positioned on either side of the steering wheel 26 and can receive and capture the tactile device 35 in an orientation on the steering wheel for a left handed driver. Any number of different capture mechanisms for brackets 38 could be substituted.

As a result, it is likely that on any given steering wheel 29 as shown in FIG. 2 the input assembly 34 can be placed proximate to the driver's normal hand position on the outer ring 29. Substantially no movement of the hand is necessary to swipe the touch pad 36 or depress the enter key 37.

Referring also to FIG. 10, the tactile device 35 also contains known electronic circuitry and functionality for sensing the passage of a thumb or other finger across the touch pad 36 and for sensing the depression of the enter key 37, e.g., see user tactile input module 1054 of FIG. 10. The housing 40 also includes a wireless communication system for communicating with a corresponding system in the mobile device, e.g., see communications module 1053 of FIG. 10. A Bluetooth system is one example of such a wireless communication system that can be used between a portable electronic device and the input assembly 34 and its tactile device 35.

Typically, the tactile device 35 will include a battery power supply and a switch, as well as a processor 1052 and memory 1051. Typically, electronic device 32, such as a mobile device, will include a memory 1001, a processor 1002, a wireless communications module 1003; and a set of applications 1004, e.g., for navigation, music or other audio play, telephone, texting, social media, and so on.

In various embodiments, a control application 1010 may be installed on the electronic device 32 which interfaces with the input assembly functionality. For example, the control application 1010 can wirelessly receive electronic device control signals from the input assembly 34, which were generated from user tactile interaction with the touch pad 36. The control application 1010 can then selectively inhibit or enable electronic device input mechanisms based thereon. For example, the control application could put the electronic device 32 in a "drive mode" wherein a phone touchscreen and/or keypad could be disabled. The control application could also provide instructions to an application (e.g., from 1004) being displayed on the display of the electronic device and reflected by the combiner glass 32 based on the electronic device control signals from the input assembly 34.

Figure 6:
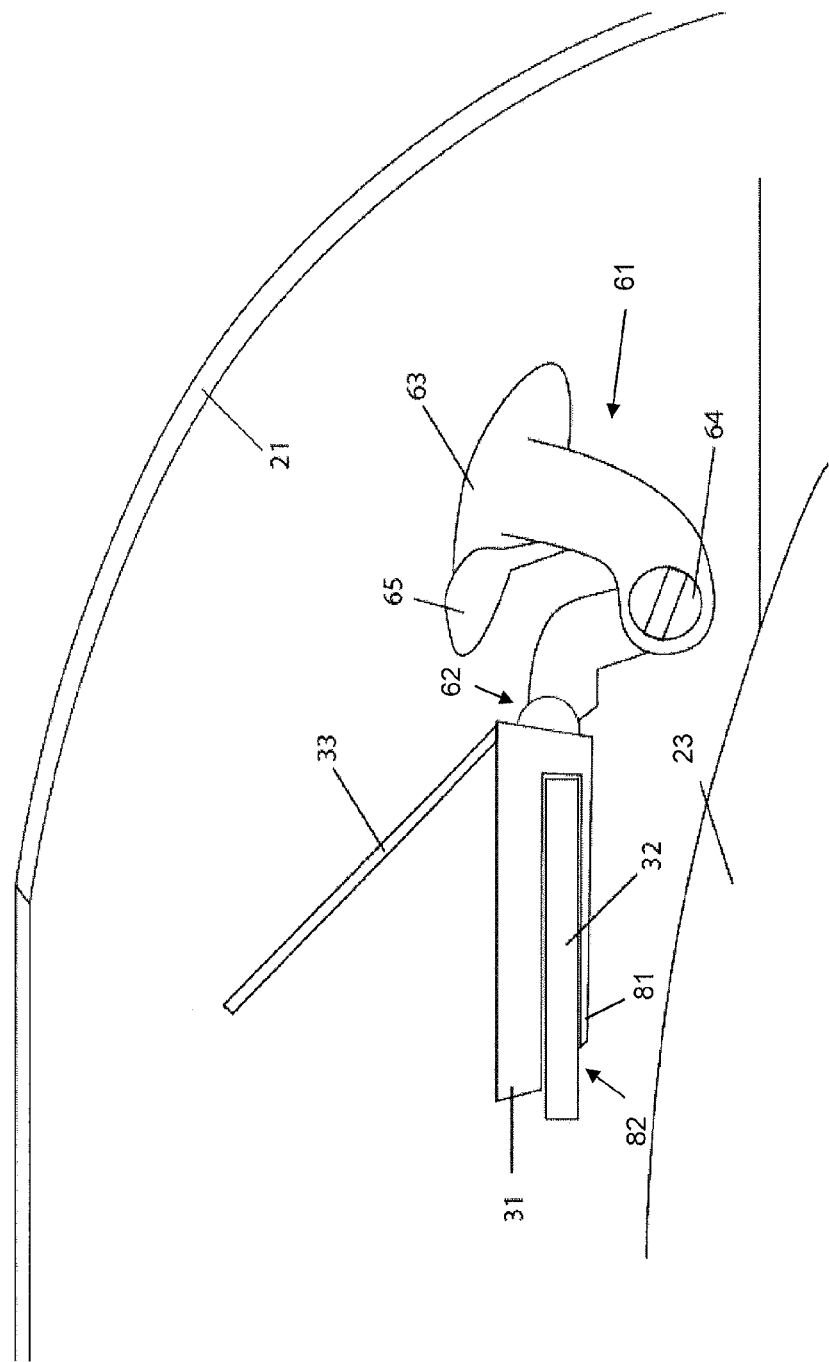
FIG. 6 provides a view of an embodiment of a display assembly supporting a mobile device coupled to a vehicle dashboard, in accordance with aspects of the inventive concept.
Figure 7:
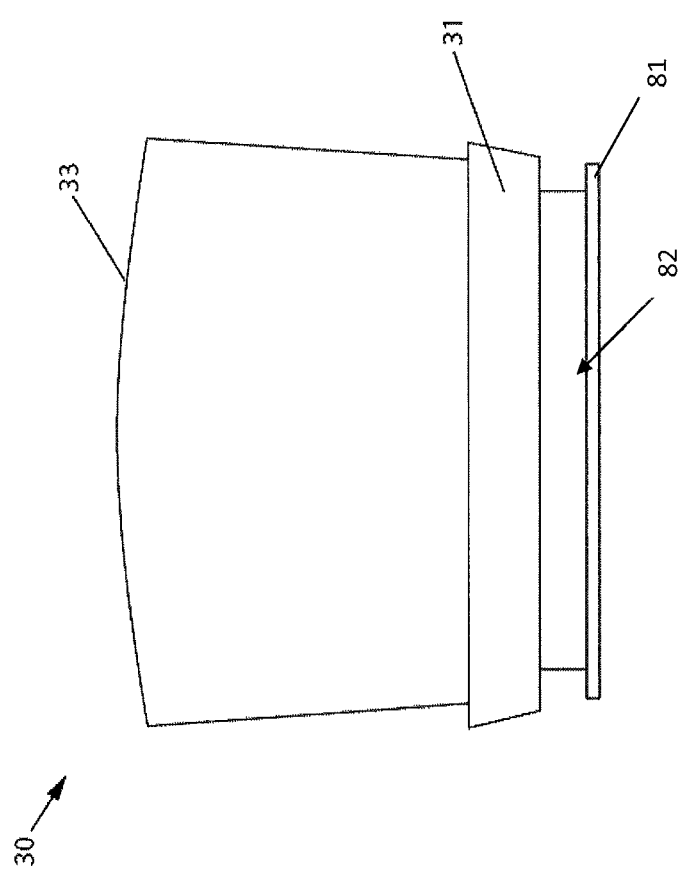
FIG. 7 is a front view of the display assembly of FIG. 6.
Figure 8:
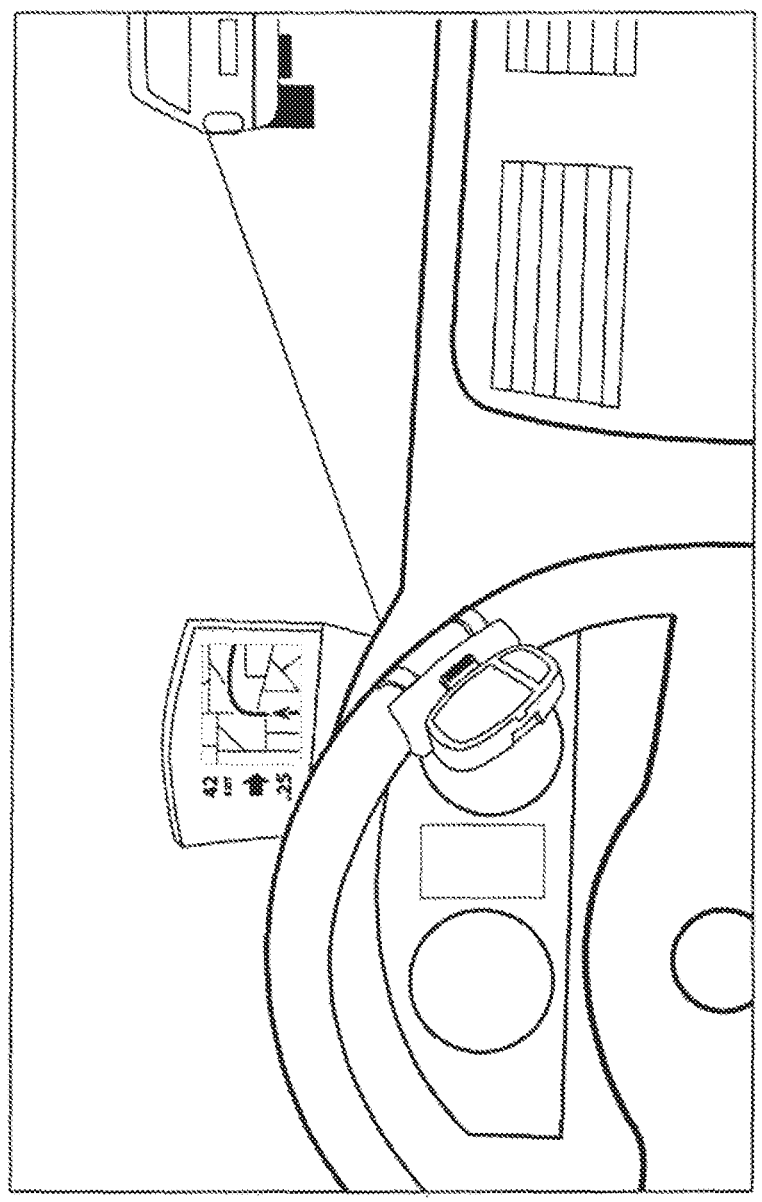
FIG. 8 is a representation of a driver's view of a dashboard and windshield of a vehicle in combination with an embodiment of a vehicle use portable heads-up display system, in accordance with aspects of the inventive concept.

Now referring to FIGS. 6-8, the heads up display assembly 30 includes a partially reflective glass 33, a windshield mounting mechanism 61, a phone 32 and an enclosure 31. In this particular embodiment, the windshield mounting mechanism 61 includes a pivot 62 and a suction cup 63. The partially reflective glass is referred to herein also as a combiner glass 33. In various embodiments, the combiner glass may be partially reflective and semitransparent. In various embodiments, the combiner glass 33 can be referred to a partially reflective mirror, which can be semitransparent.

A platform 81 carries, supports, maintains, secures, and/or holds the mobile device 32, and may be configured to align the display screen of the electronic device 32 with the combiner glass 33. The mobile device is inserted into a phone receiver 82 portion of the platform 81 facing up with the control application 1010 open, in this embodiment. The platform 81 attaches to a pivot 62 to provide flexible positioning options. A locking mechanism 64 locks the enclosure 31 relative to the mounting mechanism 61. As can be particularly recognized from FIG. 1, the structure in FIGS. 6-8 is compact and is readily mounted to a dashboard or windshield in a position that will not interfere with the driver's operation of the motor vehicle.

In various embodiments, the combiner glass 33 can be oriented to reflect the output of the display screen of the supported electronic device in a direction substantially opposite a travel direction of the vehicle. In some embodiments, the combiner glass 33 could be oriented to reflect the output of the display screen at an angle in a range of greater than 0 degrees and about 90 degrees relative to the surface of the display screen of the supported electronic device. And in some embodiments, the combiner glass 33 could be oriented to reflect the output of the display screen at an angle in a range of about 22.5 degrees to about 67.5 degrees relative to the surface of the display screen of the supported electronic device.

With this understanding of the configuration and various elements of this embodiment, it will be helpful to understand the interactions between a user/driver and the heads-up display system. In one embodiment, the driver initiates operation of the control application 1010 by energizing the mobile device 32, e.g., using the tactile device 35, and inserting the mobile device 32 into the phone receiver 82 portion of the enclosure 31. An initial display then appears on the combiner glass 33.

Figure 9A:
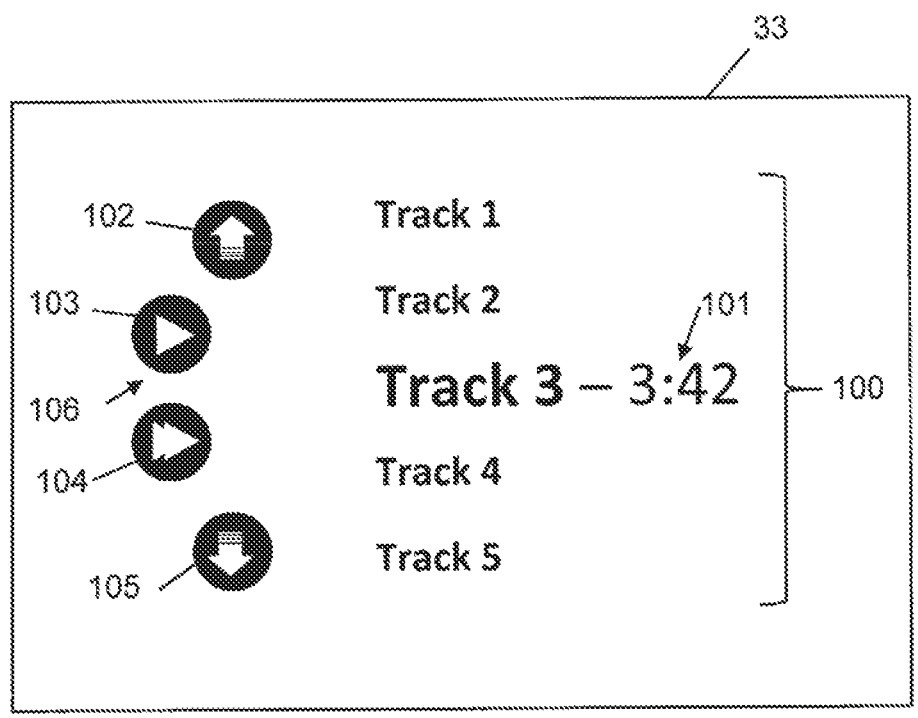
FIGS. 9A through 9C are views of embodiments of different screens that the mobile device and projector produce for driver viewing, in accordance with aspects of the inventive concept.

It is assumed, for purposes of this discussion, that the first display is a music control screen shown in FIG. 9A. A music player control application connects to music files on the mobile device 32 or music files on the internet by means of the carrier connection included in the mobile device 32. In this example, the display includes a portion 100 of a track list, with a selected track highlighted at 101, as shown for Track 3. The driver also sees four control buttons to the left of the display of FIG. 9A. A first control button 102 causes the track selection to scroll up the list. A second button 103 causes the music player application to switch between a play mode and a pause mode. Button 104 provides a skip function that causes the player application to skip to a next track. Button 105 performs a scroll down function that causes the track selection to move down the list. In FIG. 9A the button 103 is highlighted as shown at 106. While viewing this image on portion 33 of the windshield, the driver strikes the Enter key 37 to toggle the operations between the play and pause modes. If the driver wants to skip a track, a downward swipe on the touch pad 36 produces a "down arrow" function whereupon the button 104 is highlighted. While highlighted, any activation of the Enter key 37 causes the skip function to occur.

As described, controlling music with the tactile device 35 and the display in FIG. 9A distracts a driver minimally. The driver can observe the display in FIG. 9A while continuing to eye contact on the roadway. While swiping the touchpad 36 and clicking to enter key 37 the driver's hand need not be removed from the steering wheel. Consequently, such operations minimize visual distractions, manual distractions and cognitive distractions.

To look at another screen, the driver swipes his or her thumb across the touchpad 36 in a transverse or horizontal direction, in this embodiment. The control application 1010 interprets this action as a left arrow or right arrow type operation and selects an adjacent display, such as a navigation display 110 in FIG. 9B that appears in the windshield portion 33. This assumes that the navigation system has been initialized to input a destination prior to switching the system to a driving mode. As shown, this display contains minimal content, namely a road map 111 of the vicinity, a display 112 that identifies the next point (waypoint), a display 113 indicates the direction of any turn at that waypoint, and a display 114 indicates the distance to that waypoint. Visual, manual and cognitive distractions are minimized.

Such a system can also utilize the communications capability of a mobile device in handling incoming text messages, emails and data. When the mobile device 32 processes an incoming text message or email, it extracts the sender's telephone or email address as appropriate. The system also switches the display to that shown in FIG. 9C. Whatever apps are then controlling these displays in FIGS. 9A and 9B continue to operate and the interrupted display will return. A block 121 displays the telephone number or email address. The balance of the display includes buttons 122-125. Using the same selection process as described with respect to FIG. 9A, button 122 is selected for the text in the email or text message to be converted to speech so the driver can listen to the message. Many times there is a question that needs to be answered with a simple "yes" or "no." Selecting the button 123 causes the system to transmit and return an affirmative response to the sender by corresponding text message or email. Selecting button 124 causes a negative answer to be returned. These buttons can also be customized to provide other messages as the driver may desire. For example, button 125 also transmits a customizable message. As an example, selecting button 125 could return a message indicating that the driver is actually driving and will respond in the future.

Figure 9B:
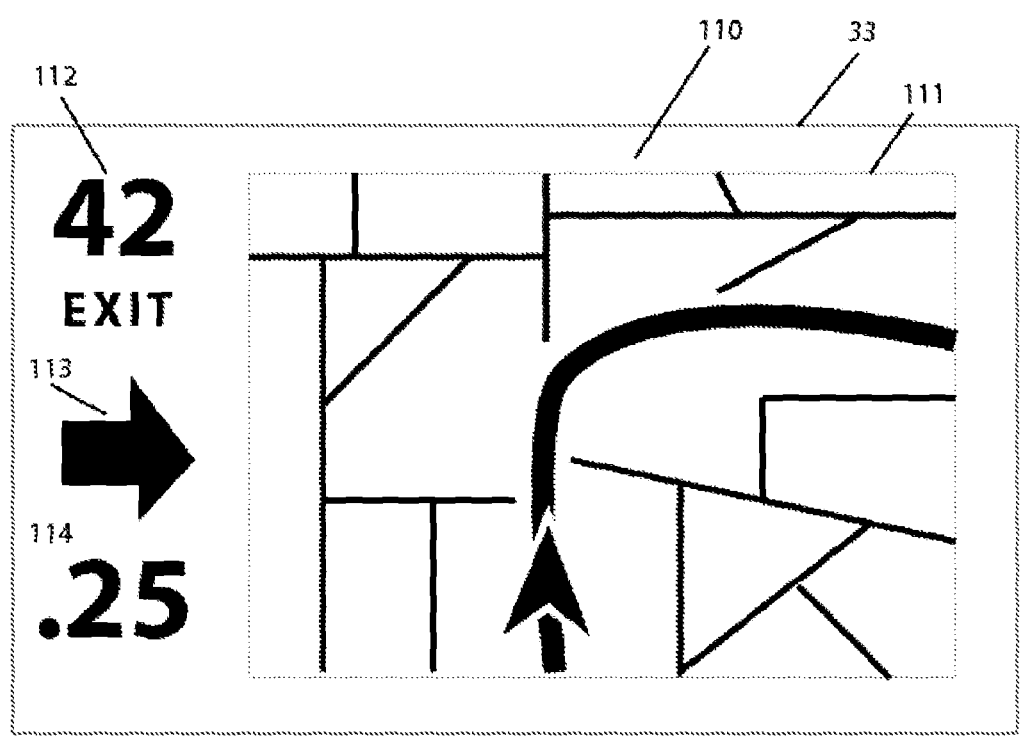
Figure 9C:
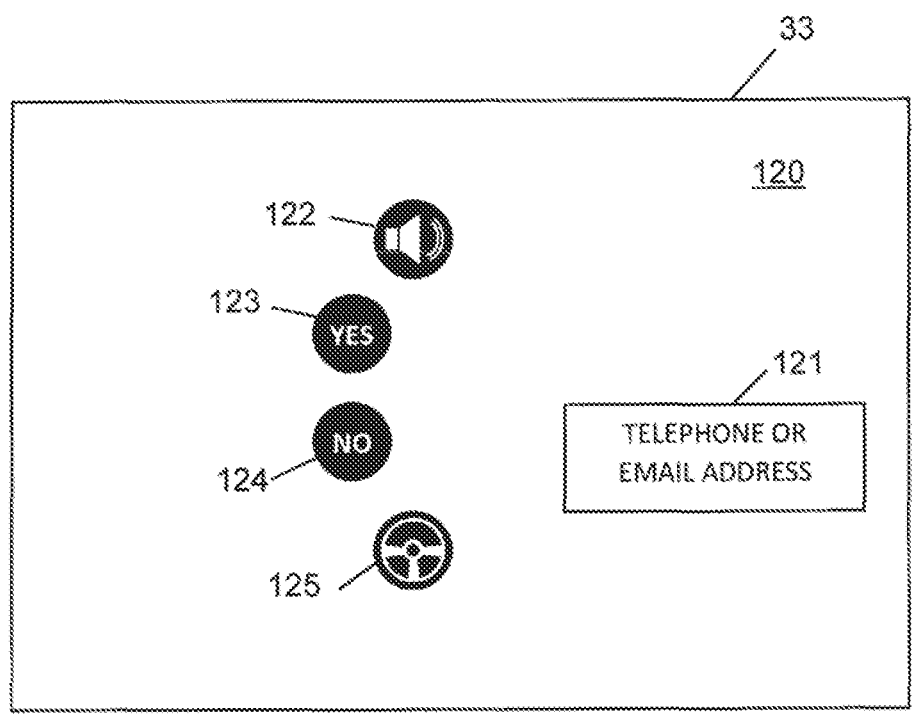

This invention has been described with a capability of displaying three different panels as shown in FIGS. 9A, 9B and 9C. However, other panels could be additionally or alternatively provided. Specifically, such a system can generate displays that are specific to unique needs of user groups. Such a display would allow a company to communicate with individual drivers with information that is tailored to that company. Such user panels can be substituted for or added to the available displays.

Those skilled in the art will appreciate that while embodiments of the present invention have been shown and described with respect to an automobile, other embodiments of the present invention could be implemented in other types of vehicles. Such vehicles could include, but are not limited to, boats, motorcycles, scooters, bicycles, motorized wheelchairs, and so on.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein. It is intended by the following claims to claim that which is literally described and all equivalents thereto, including all modifications and variations that fall within the scope of each claim.

What is claimed is:

1. A vehicle heads-up display system, comprising;
   a display assembly, comprising;
      a platform configured removably receive and physically support a mobile phone and/or tablet having a display screen;
      a combiner glass coupled to the platform and oriented at an angle with respect to the supported mobile phone and/or tablet display screen to at least partially reflect an output from the display screen,
      wherein the platform defines an opening and is configured to align the received and supported mobile phone and/or tablet display screen with the combiner glass through the opening; and
      a coupler configured couple the platform to a surface or a component of a vehicle;
   a tactile input device, comprising:
      a touch-sensitive input device configured to be responsive to user inputs;
      a transceiver configured to communicate control signals to the mobile phone and/or tablet in response to the user inputs; and
      a bracket configured in couple the tactile input device to a steering apparatus, and
   a control application configured to be installed on the mobile phone and/or tablet and, once installed, configured to respond to control signals from the tactile input device to enable user interaction with applications on the mobile phone and/or tablet via the tactile input device.

2. The system of claim 1, wherein the coupler is configured to couple the platform to at least one of a windshield or dashboard.

3. The system of claim 1, wherein the combiner glass includes a mirror.

4. The system of claim 3, wherein the mirror is a semi-transparent mirror.

5. The system of claim 3, wherein the mirror is about a 50% reflective mirror.

6. The system of claim 1, wherein the platform is configured to align the display screen of the mobile phone and/or tablet with the combiner glass.

7. The system of claim 1, wherein the combiner glass is oriented to reflect the output of the display screen of the supported mobile phone and/or tablet in a direction substantially opposite a travel direction of the vehicle.

8. The system of claim 1, wherein the combiner glass is oriented to reflect the output of the display screen at an angle in a range of greater than 0 degrees and about 90 degrees relative to the surface of the display screen of the supported mobile phone and/or tablet.

9. The system of claim 8, wherein the combiner glass is oriented to reflect the output of the display screen at an angle in a range of about 22.5 degrees to about 67.5 degrees relative to the surface of the display screen of the supported mobile phone and/or tablet.

10. The system of claim 1, wherein the touch-sensitive input device is a touchscreen.

11. The system of claim 1, wherein the touch-sensitive input device is responsive to finger swiping motions.

12. The system of claim 1, wherein the tactile user input device further comprises:
an enter button responsive to user actuation to register a selection of mobile phone and/or tablet mobile phone and/or tablet option.

13. The system of claim 12, wherein the enter button is integral with the touch-sensitive input device.

14. The system of claim 1, wherein the tactile input device further comprises:
a processor-enabled input device application configured to process the user inputs and to responsively generate the control signals for output by the transceiver.

15. The system of claim 1, wherein the control application is configured to disable input devices of the mobile phone and/or tablet in response to a signal from the tactile input device.

16. The system of claim 1, wherein the control application is configured to put the mobile phone and/or tablet in a drive mode wherein a least some of the input devices of the mobile phone and/or tablet are disabled.

17. The system of claim 1, wherein the control application is configured to enable user control of one or more of a music application, a navigation application, a phone application, a text application, a social media application, and/or combinations of one or more thereof via the tactile input device.

18. The system of claim 1, wherein the transceiver is configured to wirelessly communicate the electronic device control signals to a portable electronic device.

19. A display assembly of a vehicle heads-up display system, comprising:
a platform configured to receive and physically support a portable electronic device in a substantially horizontal position, the portable electronic device taking the form of a mobile phone having a display screen;
a combiner glass oriented at an angle with respect to the supported electronic device display screen to at least partially reflect an output from the display screen,
wherein the platform defines an opening and is configured to align the received and supported mobile phone display screen with the combiner glass through the opening; and
a coupler configured couple to a surface or a component of a vehicle,
wherein the platform is configured to align the display of the electronic device with the combiner glass.

20. The assembly of claim 19, wherein the coupler is configured to couple the platform to at least one of a windshield or dashboard.

21. The assembly of claim 19, wherein the combiner glass includes a mirror.

22. The assembly of claim 21, wherein the mirror is a semi-transparent mirror.

23. The assembly of claim 22, wherein the mirror is about a 50% reflective mirror.

24. The assembly of claim 19, further comprising:
a locking mechanism configured to lock the platform relative to the coupler.

25. The assembly of claim 19, wherein the combiner glass is oriented to reflect the output of the display screen of the supported electronic device in a direction substantially opposite a travel direction of the vehicle.

26. The assembly of claim 19, wherein the combiner glass is oriented to reflect the output of the display screen at an angle in a range of greater than 0 degrees and about 90 degree relative to the surface of the display screen of the supported electronic device.

27. The assembly of claim 26, wherein the combiner glass is oriented to reflect the output of the display screen at an angle in a range of about 22.5 degrees to about 67.5 degrees relative to the surface of the display screen of the supported electronic device.

28. A tactile input device, comprising:
a housing;
a touch-sensitive input device configured to receive user inputs;
a processor-enabled input device application configured to process the user inputs and to responsively generate electronic device control signals;
a transceiver configured to wirelessly communicate the electronic device control signals to a portable electronic device in the form of a mobile phone or tablet disposed in a heads-up display comprising a platform defining an opening and a combiner glass, wherein the platform is configured to align a display screen of the mobile phone or tablet with the combiner glass through the opening, the combiner glass oriented at an angle with respect to the display screen to at least partially reflect an output from the display screen; and
a bracket configured to couple the housing to an outer ring of a steering apparatus,
wherein the processor-enabled input device application and transceiver cooperate to generate the control signals to enable user interactions with applications on the electronic device using the touch-sensitive input device.

29. The device of claim 28, wherein the touch-sensitive device includes a selection mechanism configured to register a user selection of an electronic device option.

30. The device of clam 28, wherein the touch-sensitive input device is a touchscreen.

31. The device of claim 28, wherein the touch-sensitive input device is responsive to finger swiping motions.

32. The device of claim 28, wherein the tactile user input device further comprises:
an enter button responsive to user actuation to register a selection of an electronic device option.

33. The device of claim 32, wherein the enter button is integral with the touch-sensitive input device.

34. The device of claim 28, wherein the processor-enabled input device application and the transceiver cooperate to receive and process information wirelessly received from the portable electronic device.

35. The device of claim 28, wherein the housing is detachable from the bracket.

36. A method of interacting with a portable electronic device, comprising:
- installing a control application on the portable electronic device, the portable electronic device being a mobile phone or tablet;
- receiving and physically supporting the portable electronic device having a display screen in a display assembly comprising:
  - a platform configured to removably receive and support the portable electronic device in a substantially horizontal position;
  - a combiner glass oriented at an angle with respect to the supported electronic device display screen to at least partially reflect an output from the display screen, wherein the platform aligns the display screen with the combiner glass,
  - wherein the platform defines an opening and is configured to align the received and supported mobile phone or tablet display screen with the combiner glass through the opening; and
  - a coupler configured to couple to a surface or a component of a vehicle; and
- controlling the electronic device with a tactile input device, comprising:
  - touch-sensitive input device configured to be responsive to user inputs;
  - a processor-enabled input device application configured to process the user inputs and to responsively generate electronic device control signals;
  - a transceiver configured to communicate the electronic device control signals to the portable electronic device in response to the user inputs; and
  - a bracket configured to couple the tactile input device to a steering apparatus,
- including the control signals providing user interaction with applications on the portable electronic device.

* * * * *